(12) United States Patent
Pradhan et al.

(10) Patent No.: US 10,175,425 B2
(45) Date of Patent: Jan. 8, 2019

(54) INTEGRATED POLARIZING AND ANALYZING OPTICAL FIBER COLLIMATOR DEVICE AND METHODS OF USE THEREOF

(71) Applicant: Micatu Inc., Horseheads, NY (US)

(72) Inventors: Atul Pradhan, Pittsford, NY (US); Scott Stelick, Slaterville Springs, NY (US)

(73) Assignee: Micatu Inc., Horseheads, NY (US)

( * ) Notice: Subject to any disclaimer, the term of this patent is extended or adjusted under 35 U.S.C. 154(b) by 0 days.

(21) Appl. No.: 15/648,221

(22) Filed: Jul. 12, 2017

(65) Prior Publication Data

US 2018/0017734 A1    Jan. 18, 2018

Related U.S. Application Data

(60) Provisional application No. 62/361,825, filed on Jul. 13, 2016.

(51) Int. Cl.

| | | |
|---|---|---|
| *G02B 6/293* | (2006.01) | |
| *G02B 3/12* | (2006.01) | |
| *G02B 6/255* | (2006.01) | |
| *G02B 6/26* | (2006.01) | |
| *G02B 6/27* | (2006.01) | |
| *G02B 6/35* | (2006.01) | |
| *G02B 23/10* | (2006.01) | |
| *G02B 27/30* | (2006.01) | |

(52) U.S. Cl.
CPC ............ *G02B 6/2937* (2013.01); *G02B 3/12* (2013.01); *G02B 6/2551* (2013.01); *G02B 6/262* (2013.01); *G02B 6/2746* (2013.01); *G02B 6/351* (2013.01); *G02B 23/105* (2013.01); *G02B 27/30* (2013.01)

(58) Field of Classification Search
CPC ............................... G02B 6/2937; G02B 6/12
See application file for complete search history.

(56) References Cited

U.S. PATENT DOCUMENTS

| | | | |
|---|---|---|---|
| 5,040,863 A | 8/1991 | Kawakami et al. | |
| 5,812,707 A | 9/1998 | Yamane et al. | |
| 6,654,517 B2 * | 11/2003 | Fairchild | G02B 6/29365 385/16 |
| 2004/0001677 A1 | 1/2004 | Kondis et al. | |
| 2004/0223222 A1 | 11/2004 | Schott et al. | |
| 2004/0223678 A1 * | 11/2004 | He | G02B 6/024 385/11 |
| 2012/0294573 A1 | 11/2012 | Kadar-Kallen et al. | |
| 2013/0128262 A1 * | 5/2013 | Kajioka | A61B 5/14532 356/73 |

(Continued)

OTHER PUBLICATIONS

International Search Report for PCT/US2017/041747, dated Sep. 21, 2017, pp. 1-9.

*Primary Examiner* — Sung H Pak
(74) *Attorney, Agent, or Firm* — LeClairRyan PLLC (57) ABSTRACT

An integrated optical collimator device includes an optical fiber extending from a first end to a second end. The first end of the optical fiber is configured to be coupled to a light source or a light receiver. A housing is coupled to the ferrule and extends radially over the ferrule. A collimating lens is positioned in the housing proximate the second end of the optical fiber. A polarizer element is positioned within the housing proximate the collimating lens.

20 Claims, 4 Drawing Sheets

(56) References Cited

U.S. PATENT DOCUMENTS

2013/0330039 A1* 12/2013 Liu .................. G02B 6/32
    385/33
2014/0003773 A1* 1/2014 Sawada ............ G02B 6/3857
    385/79
2014/0300962 A1* 10/2014 Hosokawa ........... B23K 26/08
    359/484.03

* cited by examiner

INTEGRATED POLARIZING AND ANALYZING OPTICAL FIBER COLLIMATOR DEVICE AND METHODS OF USE THEREOF

This application claims the benefit of U.S. Provisional Patent Application Ser. No. 62/361,825, filed Jul. 13, 2016, which is hereby incorporated by reference in its entirety.

FIELD OF THE INVENTION

The present technology relates to an integrated optical collimator device and methods of use thereof.

BACKGROUND OF THE INVENTION

There are many applications for fiber-optic pigtailed collimators and similar components within optical systems and assemblies. A fiber-optic collimator delivers light through an optical fiber or similar pigtail or conduit. The optical fiber or other conduit couples directly to a light source, or other devices capture the light from the light source and deliver the light to the optical fiber. The light transmits through the optical fiber to the end-face of the fiber, fixed in a ferrule, where the light launches into free space as a diverging beam. The light is then incident onto a lens, which converges or collimates the beam with a lower divergence angle for further propagation along a defined optical axis.

There are also many applications for polarizers within optical systems and components. Specifically, many systems or components utilize polarizers where it is important to control or analyze the direction and intensity of polarized light or light oriented in a specific polarization state. In these uses and applications, once the light is polarized, there is a need to analyze and determine the orientation of the polarized light. The use of polarizers combined with analyzers of polarized light most generally is referred to as a polarization diversity scheme or system. In many polarization diversity schemes or systems, fiber-optic collimators provide the input and exit of light.

Optical systems that efficiently embody a polarization diversity scheme generally include at least the following features: (1) a fiber-optic input and/or exit of light, (2) collimation and/or focusing of the light, or other beam-shaping, (3) polarization selection, manipulation, and/or analysis of the light, and if necessary, (4) a fiducial mark or tag indicating polarization and/or analysis direction or manipulation of the light. These features are conventionally achieved by functional optical elements located distinctly and separately in a free-space set-up, breadboard, or assembly.

A major problem in the art of optical systems that use polarization diversity schemes, systems, and techniques is that the optical or fiber-optic components and the polarization components, such as polarizers and analyzers, are distinct. The use of distinct, or separate, or uniquely specified optical or fiber-optic components when combined with polarizing or analyzing components leads to optical systems with multiple distinct components, which can be exceedingly numerous. Polarization diversity schemes provided by such systems with multiple components are complex and cumbersome. Thus, optical or fiber-optic systems that incorporate polarization diversity schemes exhibit exorbitant cost in terms of the use of bulk components, the number and size of components, and a large unwieldy packaging footprint, as well as size and weight that are ill suited for many applications. Further, a solution using separate optical elements exposes each of the separate optical surfaces to environmental exposure.

Optical collimators that use a polarization maintaining pigtail also have disadvantages. Polarization maintaining (PM) fibers have ellipticity in the polarization profile as defined by the stress inducing core guiding elements of the fiber. PM fibers are also typically single mode, making it difficult to inject or couple light into the fiber and suffer high sensitivity to bend loss. PM fiber is also complex to manufacture, high cost, and fragile compared to the use of standard single or multimode fiber.

The present technology is directed to overcoming these and other deficiencies in the art.

SUMMARY OF THE INVENTION

One aspect of the present technology relates to an integrated optical collimator device. The integrated optical collimator device includes an optical fiber having a length extending from a first end to a second end. The first end of the optical fiber is configured to be coupled to a light source or a light receiver. A housing is configured to receive at least a portion of the optical fiber including the second end. A collimating lens is positioned in the housing and is optically coupled to the optical fiber. A polarizer element is positioned in the housing and is optically coupled to the collimating lens.

Another aspect of the present technology relates to a method of making an integrated optical collimator device. The method includes providing an optical fiber extending between a first end to a second end, wherein the first end is configured to be coupled to a light source or a light receiver. At least a portion of the optical fiber including the second end is inserted into a housing. A collimating lens and a polarizer element are positioned in the housing such that the optical fiber is optically coupled to the collimating lens and the collimating lens is optically coupled to the polarizer element.

The use of polarized light aligned to a specific direction is generally achieved through three sequential optical elements with distinct functions: (1) launch of the light from the light source or from a suitable conduit from the source such as a fiber, (2) collimation of the divergent beam from the fiber tip using a lens, and (3) polarization of the light using a polarizer to polarize the light and fix the direction of polarization. The first two functions are combined in a fiber-optic collimator, which is familiar to those skilled in the art fiber-optic light delivery. The use of a polarizer or polarizing element is conventionally a separate and distinct optical element placed after (or before) the fiber-optic collimator depending on the application, such as a polarizer or analyzer. In order to enable optical miniaturization and integration, reduce optical and polarization misalignments and attendant polarization fluctuations and jitter that can be necessary for demanding optical polarization applications, the integrated unit of the present technology integrates the polarizer functionality into the fiber-optic collimator.

The present technology advantageously provides an integrated optical assembly unit that combines the critical features of fiber-optic delivery and/or exit, collimation and focusing of light, polarization, analysis and selection, and fiducial marking, in a compact, low size, low weight, and low cost, integrated unit. The present technology is advantageously suited for mini- and micro-optic applications and systems. With suitable opto-mechanical design and the use of adhesives or epoxies, the integrated optical collimator device with polarizing or polarization manipulating elements of the present technology can withstand harsh environments including environments exposed to high temperatures, high humidity, or large electromagnetic fields, such as for example, locations near high voltage or high current carrying power lines deployed in the field.

Advantages of using the integrated polarizing optical fiber collimator device include streamlining and reducing size, cost, and weight of the device by combining the separate functions of fiber-optic guiding, launch or coupling of light, collimation or focusing of light, and polarization and analysis selection and definition in a single integrated unit. The combination into the single unit allows for miniaturization of the optical system. Moreover, the integrated fiber-optic collimator acts as one rigid, complete unit, with no moving parts, that can be made impervious to environmental degradation, robust, and hermetically sealed for optimal performance over temperature and humidity.

DETAILED DESCRIPTION

The present technology relates to an integrated optical collimator device and methods of use thereof. More specifically, the present invention relates to an integrated fiber optic collimator device that provides an optical fiber, a ferrule, a collimating lens, and a polarizer or polarizing element integrated in a single housing. The integrated fiber optic collimator device may be utilized as polarizer and/or an analyzer.

One aspect of the present technology relates to an integrated optical collimator device. The integrated optical collimator device includes an optical fiber extending from a first end to a second end. The first end of the optical fiber is configured to be coupled to a light source or a light receiver. A housing is coupled to the ferrule and extends radially over the ferrule. A collimating lens is positioned in the housing proximate the second end of the optical fiber. A polarizer element is positioned within the housing proximate the collimating lens.

Figure 1:
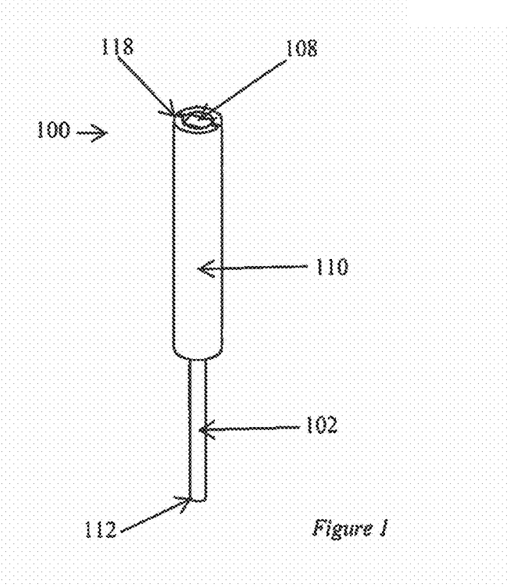
FIG. 1 is a perspective view of an exemplary integrated optical collimator device of the present technology.
Figure 2:
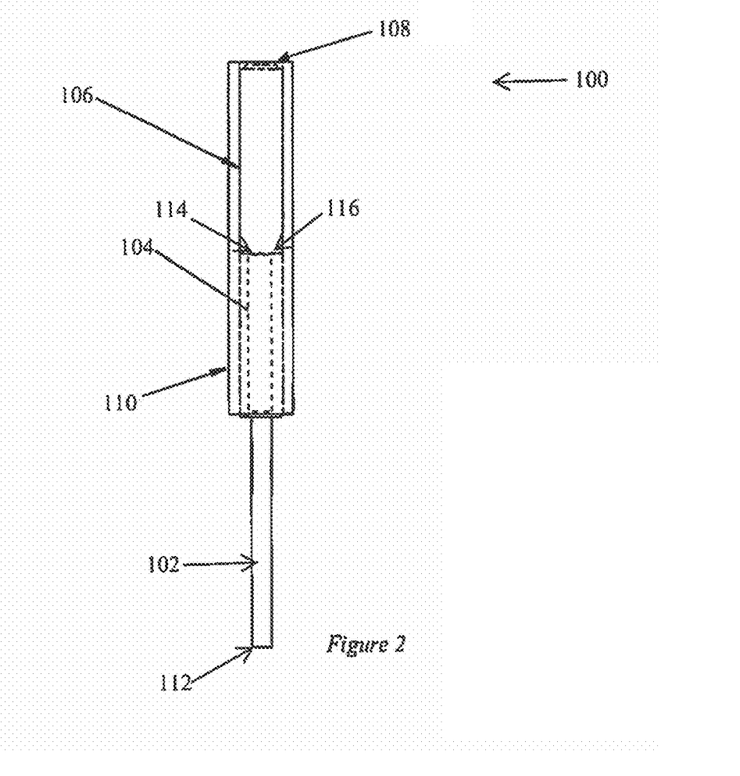
FIG. 2 is a side cross-sectional view of the exemplary integrated optical collimator device illustrated in FIG. 1.
Figure 3:
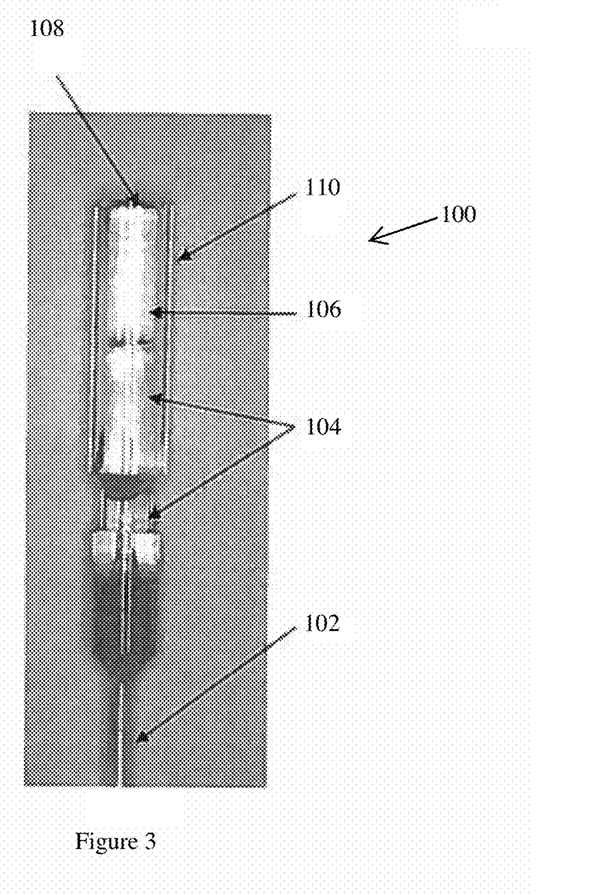
FIG. 3 is an image of the exemplary integrated optical collimator device of the present technology.

FIGS. 1-3 illustrate an exemplary embodiment of an integrated optical collimator device 100 of the present technology. The integrated optical collimator device 100 includes an optical fiber 102, a fiber ferrule 104, a collimating lens 106, a polarizer element 108, and a housing 110. The integrated optical collimator device 100 may include other types and numbers of elements or components in other configurations, including additional optics such as lenses, prisms, or filters, by way of example only. Additional optics may be utilized, by way of example, to redirect, focus, collimate, or filter the wavelength of light within the integrated optical collimator device 100.

The integrated optical collimator device 100 provides a device that employs a polarization diversity scheme in a single integrated unit that advantageously reduces the size, weight, complexity, and cost of the device. The integrated optical collimator device 100 may be used in a number of optical applications that require a polarizer and/or an analyzer. By way of example, the integrated optical collimator device 100 may be employed in environments exposed to high temperatures, high humidity, or large electromagnetic fields, such as locations near high voltage or high current carrying power lines deployed in the field.

Referring again to FIGS. 1-3, the integrated optical collimator device 100 includes the optical fiber 102, although other types of optical waveguides may be utilized. The optical fiber 102 provides a long thin waveguide that confines and guides light and photons entering and/or exiting the integrated optical collimator device 100. The optical fiber 102 extends between a first end 112 and a second end 114. The first end 112 of the optical fiber 102 is configured to be coupled to a light source or a light receiver depending on the application. The integrated optical collimator device 100 may be employed with any light sources or light receivers known in the art. The second end 114 of the optical fiber 102 is a cleaved end configured to launch light travelling through the optical fiber 102 into free space.

As will be understood by those knowledgeable in the art, optical fibers and waveguides are available in several types and configurations depending on the application and wavelength range of the light of interest. By way of example only, index guiding glass, ceramic, or plastic fibers, with a core and cladding. Either step, continuous, or multiple refractive index claddings may be utilized for the optical fiber 102. In addition, glass, ceramic, plastic, and metal hollow core fibers, photonic bandgap, or photonic crystal fibers may also be used as part of the optical fiber 102. In this example, the optical fiber 102 is a single mode optical fiber, although multimode fibers may also be employed. According to one example, the use of a multimode fiber for the optical fiber 102 would allow for a high number of modes of light to propagate in the optical fiber 102. This would allow the integrated optical collimator device to select and convert substantially random, or partially polarized, light to linear polarized light.

The optical fiber 102 is inserted into the fiber ferrule 104 such that a portion optical fiber 102 surrounded and secured by the fiber ferrule 104. Methods for constructing fiber ferrules are well known in the art so that the end of the optical fiber 102 is cleaved and substantially aligned with optical polished end of the fiber ferrule 104. The combination of the optical fiber 102 and the fiber ferrule 104 is commonly referred to as a fiber pigtail. The fiber ferrule 104 acts as an alignment sleeve with an end face 116 of the fiber ferrule 104 providing a reference surface coplanar to the cleaved second end 114 of the optical fiber 102. Light propagating within the optical fiber 102 is launched into free space at the cleaved second end 114 of the optical fiber 102 with a divergence given by the object space numerical aperture. The fiber ferrule 104 can be glass, ceramic, plastic, or metal, although other materials may be utilized. In this example, the fiber ferrule 104 is cylindrical, although ferrules in other configurations may be used.

Lens 106 is positioned proximate to the second end 114 of the optical fiber 102. In this example, the lens 106 is a collimating lens, such as a GRIN lens by way of example only, such that light emitted from the second end 114 of the optical fiber 102 is focused by the lens 106 into a collimated beam with a low divergence angle. Alternatively, lens 106 may provide collimated light to the second end 114 of the optical fiber in an example where the first end 112 of the optical fiber 102 is coupled to a light receiver. The light focused by the lens 106 can propagate such that it is not diffused, or so that its loss of intensity is reduced over distance. The lens 106 is defined by a clear aperture (CA) indicating the spatial extent of the useable surface of the lens 106 through which a beam of light is normally designed to transmit with minimal distortion. By way of example only, the lens 106 may be composed of glass, plastic, transparent ceramic, or crystal. Although the use of a single collimating lens 106 is described, it is to be understood that other types and numbers of lenses in other configurations could be used. The lens 106 has least one surface that is flat, not curved, and does not have any optical power, in order to attach a flat polarizing element as described below. Exemplary lenses for integrating and attaching the polarizer include, but are not limited to plano convex c-lenses with the flat surface as the last (first) surface for an outgoing (incoming) beam of light, respectively, or a gradient-index lens (GRIN lens), which intrinsically has flat end face surfaces.

The polarizer element 108 is positioned proximate the lens 106, which in this example is a collimating lens, such that the light exiting the lens 106 is incident on the polarizer element 108. In one example, the polarizer element 108 is bonded to the clear aperture of the collimating lens 106 using an adhesive or epoxy. Since the polarizer element 108 is attached and fixed to the lens 106, there can be no polarization axis variation with respect to the lens 106 due to relative roll about the optical axis of the beam of light. Such variation can rotate, and therefore change the polarization axis of the polarizer element 108 over the clear aperture that contains the light beam. In addition, the present technology eliminates variation in relative pitch and yaw degrees of freedom between the polarizer element 108 and the lens 106, which would change the angle of incidence of the light beam on the polarizer element 108 and therefore result in a change of intensity and effective extinction coefficient of the polarizer element 108 for the outgoing (incoming) beam, respectively. In other examples the polarizer element 108 is bonded to the housing 110, and in yet other examples, it is also possible for the polarizer element 108 to be attached to the end face of the fiber ferrule 104 covering the launch tip of the optical fiber 102. The polarizer element 108 may have an optical, perpendicular, or normal axis that is fixed relative to an optical or mechanical axis of the lens 106.

Figure 4:
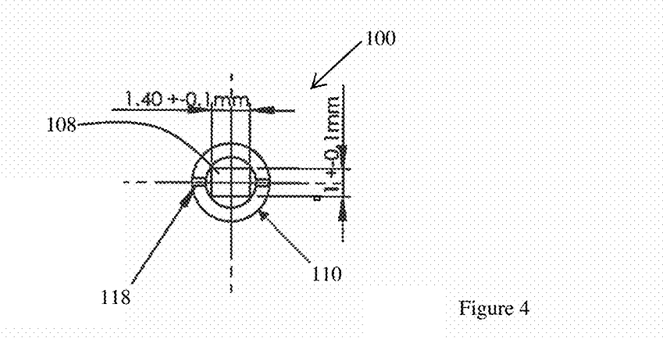
FIG. 4 is a top view of an exemplary integrated optical collimator device illustrated in FIG. 1 with a polarizing chip and a fiducial mark aligned with the polarization axis.

The polarizer element 108 may be a polarizing chip or a polarizing film. In one example, as shown in FIG. 4, the polarization element 108 is a polarizing chip, dimensionally diced to be located within the bore of the housing 110 and affixed atop of lens 106. The polarization element 108 is fabricated to fit over the clear aperture of the lens 106 encompassing the outgoing (or incoming) beam of light. Fabrication methods and details for attaching the polarization element 108 to the flat side of the lens 106 include, but are not limited to, dicing and sizing the polarization element 108 and bonding it to the lens using epoxy or adhesive.

In this example, the polarizing chip has dimensions of about 1.4 mm×about 1.0 mm±0.1 mm, although other dimensions may be employed. Referring again to FIGS. 1-3, the polarizer element 108 may also be a polarization manipulating optical element such as an optical waveplate or retarder, or both. In one example, multiple polarizer elements or polarization manipulating elements may be used in different combinations as the polarizer element 108. The polarizer element 108 may be composed of a variety and combination of materials including glass, crystal, plastic or polymers, and dielectric thin films and metals.

The polarizer element 108 is configured to select and filter the light along one of the linear axes orthogonal to the direction of light propagation. In one example, polarizer element 108 is configured to impart a specific amount of optical phase along, or relative to, polarization axes, such as a quarter wave plate or half wave plate. The polarizer element 108 can be configured to provide a variety of states of polarization, including, but not exclusive of, linear, circular, or elliptical, or other polarization states that can be described by a Jones matrix, or partial degree of polarization, through the use of absorbing elements that attain a general state of polarization described by a Stokes matrix. The use of the polarizing element 108 allows for a high extinction ratio in comparison to the use of a polarization maintaining (PM) fiber.

The discrete optical components including the fiber ferrule 104, collimating lens 106, and polarizer element 108 are all contained and secured in a fixed manner in the housing 110. In this example, the housing 110 is a hollow tube with a cylindrical bore encased by a concentric shell, or wall of material defined by an inner diameter (ID) and an outer diameter (OD). The collimator housing 110 or tube extends radially outward and is substantially centered or concentric to the axis of propagation of the light beam through the optical fiber 102. The collimator housing 110 or tube can be made of glass, ceramic, or metals such as aluminum or stainless steel, by way of example, although or other similar materials that are sufficiently rigid may be utilized. In one example, the housing 110 is hermetically sealed.

The discrete optical components, including the fiber ferrule 104, the collimating lens 106, and the polarizer element 108, by way of example, can be fixed within the housing 110 in a rigid manner. The optical components may be fixed in the housing 110 using a variety of attachment mechanisms including, by way of example only, adhesives, epoxies, mechanical mechanisms such as set screws, springs, or flexures built into the body of the housing 110 or tube, or combinations thereof.

Referring now to FIG. 4, in one example, the housing 110 includes a polarization or fiducial mark 118 located on the glass housing 110. In this example, the fiducial mark 118 is aligned along the long axis of the integrated optical collimator device 100, although other marks in other alignments may be utilized. The fiducial mark 118 indicates the polarizing direction of the polarization element 108, such as a polarizing chip by way of example.

Figure 5A:
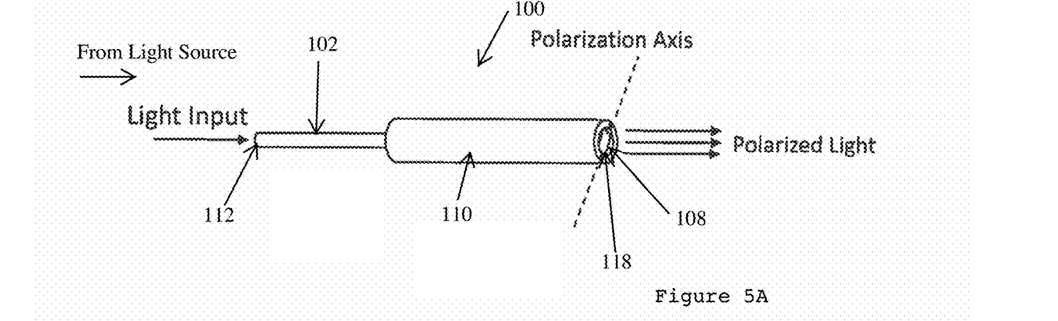
FIGS. 5A and 5B are functional block diagrams of exemplary operations of the exemplary integrated optical collimator device of the present technology as a polarizer (FIG. 4A) and an analyzer (FIG. 4B).

Exemplary operations of the integrated optical collimator device 100 of the present technology will now be described with reference to FIGS. 1-5B. In one example, as illustrated in FIG. 5A, the integrated optical collimator device 100 acts as a polarizer to produce an outgoing beam of polarized light. In this example, light is delivered into the optical fiber collimator device 100 through optical fiber 102. Optical fiber 102 may be coupled directly to a light source or may receive light from the light source through other components. The optical fiber collimator device 100 may be utilized in this example with any number or type of light source known in the art.

The input light enters into the housing 110 through the combination of the optical fiber 102 and the fiber ferrule 104, or the fiber pigtail. The fiber pigtail is combined with the lens 106 to deliver light from the fiber pigtail into the lens 106, such as a GRIN lens by way of example. The lens 106 serves to substantially collimate, or reduce the divergence angle of light launched from the fiber pigtail. The lens 106 may also be utilized for other beam-shaping changes, or modifying the cone angle of the light such that the beam profile is optimized to a particular cross-sectional profile.

The collimated light from the lens 106 is then incident on the polarizer element 108, such as a polarizing chip by way of example. The polarizer element 108 selects and filters the light along one of the linear axes orthogonal to the direction of light propagation from the lens 106. In one example, polarizer element 108 imparts a specific amount of optical phase along, or relative to, polarization axes, such as a quarter wave plate or half wave plate. The polarizer element 108 can provide a variety of states of polarization, including, but not exclusive of, linear, circular, or elliptical, or other polarization states that can be described by a Jones matrix, or partial degree of polarization, through the use of absorbing elements that attain a general state of polarization described by a Stokes matrix.

The launched light exiting the integrated optical collimator device 100 is substantially polarized along the polarization axis of the polarizer element 108 as indicated by the fiducial mark 118 on the housing 110. In this example, the polarization direction is given by a line that starts at the point of the indicated fiducial mark 118 and diametrically bisecting the integrated optical collimator device 100 through the center. The launched light may be utilized in any optical systems or other applications that require a polarized light source.

Figure 5B:
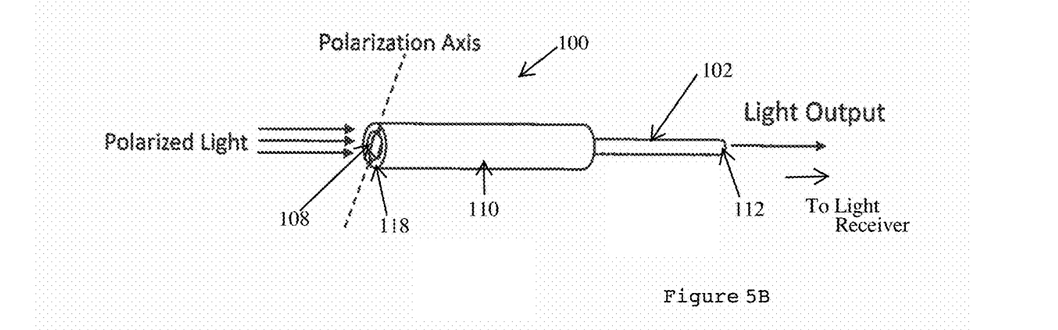

In another example, as illustrated in FIG. 5B, the integrated optical collimator device 100 acts as a polarization analyzer to analyze a source of polarized incoming light. In this example, polarized light is received into the optical fiber collimator device 100 through the polarization element 108. In this example, the polarization element 108 as a polarization analyzer to quantify the amount of polarized light projected along the polarization axis of the integrated optical collimator device as indicated by the fiducial mark 118. In this example, the polarization direction is given by a line that starts at the point of the indicated fiducial mark 118 and diametrically bisecting the integrated optical collimator device 100 through the center.

The lens 106 focuses the light received through the polarizer element 108 into the exiting fiber pigtail comprised of the fiber ferrule 104 and the optical fiber 102. Optical fiber 102 may be coupled directly to a light receiver configured to receive and quantify the amount of polarized light passed through the polarization element 108 based on the polarized light delivered through optical fiber 102. Alternatively, the optical fiber may deliver the output light to the light receiver through other components. The optical fiber collimator device 100 may be utilized in this example with any number or type of light receivers known in the art.

Figure 6:
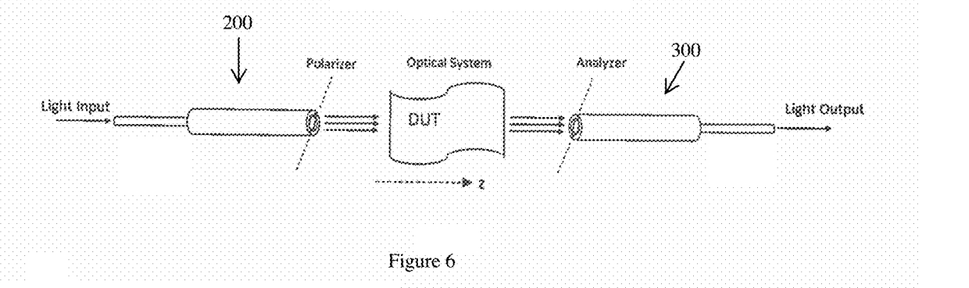
FIG. 6 illustrates an exemplary embodiment of an environment in which the exemplary integrated optical collimator device of the present technology is utilized as both a polarizer and an analyzer with an optical system or Device Under Test (DUT) in which the polarization state changes as light passes through it.

Referring now to FIG. 6, an environment including examples of integrated optical collimator devices 200 and 300 in use in an optical system as a polarizer and a polarization analyzer, respectively, is illustrated. The integrated optical collimator devices 200 and 300 are the same in structure and operation as the integrated optical collimator device 100 except as described below.

In this optical set-up, the integrated polarizing optical fiber collimator device 200 acts as a polarizer for light input into the optical system, defining the launch polarization axis. The integrated polarizing optical fiber collimator 300 servers as an analyzer and selects the polarization axis for analysis at the exit of the optical system and subsequently focusing (by the lens) the light into the output optical fiber. In this example, the integrated optical collimator devices 200 and 300 are used with a device a device under test (DUT).

The DUT could be an optical element or system that exhibits birefringence that modifies the amplitude of polarized light along a particular birefringent axis. To those skilled in the art, it is well-known that birefringence is susceptible to a variety of environmental and mechanical factors such as stress, temperature, and pressure. The polarizer-DUT-analyzer system utilizing the integrated optical collimator device 200 as an input polarizer and the integrated optical collimator device 300 as an output analyzer could be used as a fixed polarimeter to select and measure the amount and change in polarized light exiting the DUT along a particular polarization direction. The integrated fiber-optic polarizing collimator of the present technology advantageously eliminates alignment errors and variations due to excess relative opto-mechanical degrees associated with separate lens and polarizer elements that could obscure minute variations in polarization variation and extinction due to birefringence in the DUT.

The integrated fiber-optic polarizing collimator can be used to measure the polarization variation in a polarizer-DUT-analyzer system, in which the DUT exhibits birefringence. Assume, without loss of generality, that the propagation direction of light through the DUT is the z-axis, and there exist two orthogonal axes, x and y, that characterize the ordinary and extraordinary axes of refractive index or polarization variation, with transmission of polarized light along each of these axes x and y, given by $P_x$ and $P_y$, respectively. The integrated optical collimator device 200 can be oriented rigidly and attached to the DUT so that the polarizer axis, as given by the fiducial mark, is at an angle of θ to the x-axis. The light exiting the integrated optical collimator device 200 therefore has initial amplitude projections of cos(θ) and sin(θ) along the x-axis y-axis, respectively. The integrated optical collimator device 300, which serves a polarization analyzer, can then be oriented rigidly and attached to align along either the x-axis or the y-axis of the DUT, so that the analyzed light output is $P_x \cos^2(\theta)$ or $P_y \sin^2(\theta)$, according to the alignment of the polarizer fiducial mark of the integrated optical collimator device 300, along either the x-axis or y-axis of the DUT, respectively, in each case.

Although preferred embodiments have been depicted and described in detail herein, it will be apparent to those skilled in the art that various modifications, additions, substitutions, and the lie can be made without departing from the spirit of the invention as defined in the claims that follow.

What is claimed is:

1. An integrated optical collimator device comprising:
    an optical fiber extending between a first end to a second end, wherein the first end is configured to be coupled to a light source or a light receiver;
    a ferrule surrounding the at least a portion of the optical fiber and bonded to the optical fiber proximate the second end of the optical fiber;
    a housing having a cylindrical bore configured to receive the ferrule and the at least a portion of the optical fiber including the second end;
    a collimating lens positioned in the cylindrical bore of the cylindrical housing in contact with the ferrule with the second end of the optical fiber positioned proximate to the collimating lens; and a polarizer element positioned in the cylindrical bore of the cylindrical housing and bonded to an output clear aperture of the collimating lens.

2. The device as set forth in claim 1, wherein the ferrule is cylindrical.

3. The device as set forth in claim 1, wherein the ferrule is formed from glass or ceramic.

4. The device as set forth in claim 1, wherein the housing extends radially over the ferrule and the ferrule is bonded to the housing.

5. The device as set forth in claim 1, wherein the housing is formed from glass or ceramic.

6. The device as set forth in claim 1, wherein the housing extends radially over the collimating lens and the collimating lens is bonded to the housing.

7. The device as set forth in claim 1, wherein the polarizer element comprises one of a polarizer chip or a polarizer film.

8. The device as set forth in claim 1, wherein the polarizer element is bonded to an end of the housing near the collimating lens.

9. The device as set forth in claim 1 further comprising a fiducial mark located on the housing at a center of a clear aperture of the collimating lens.

10. The device as set forth in claim 1, wherein the polarizer element has an optical, perpendicular, or normal axis that is fixed relative to an optical or mechanical axis of the collimating lens.

11. The device as set forth in claim 1, wherein the polarizer element comprises one of a waveplate, a retarder, or a polarization manipulation element positioned proximate the collimating lens.

12. The device as set forth in claim 1, wherein the housing is hermetically sealed.

13. A method of making an integrated optical collimator device, the method comprising:
    providing an optical fiber extending between a first end to a second end, wherein the first end is configured to be coupled to a light source or a light receiver;
    providing a ferrule surrounding the at least a portion of the optical fiber, wherein the ferrule is bonded to the optical fiber proximate the second end of the optical fiber;
    inserting the ferrule and the at least a portion of the optical fiber including the second end into a housing having a cylindrical bore;
    positioning a collimating lens in the cylindrical bore of the housing such that the collimating lens is in contact with the ferrule with the second end of the optical fiber positioned proximate to the collimating lens; and
    positioning a polarizer element in the cylindrical bore of the housing such that the optical fiber is bonded to an output clear aperture of the collimating lens;
    a polarizer element positioned in the cylindrical bore of the cylindrical housing and bonded to an output clear aperture of the collimating lens.

14. The method as set forth in claim 13 further comprising bonding the ferrule to the housing such that the housing extends radially over the ferrule.

15. The method as set forth in claim 13 further comprising bonding the collimating lens to the housing such that the housing extends radially over the collimating lens.

16. The method as set forth in claim 13, wherein the polarizer element comprises one of a polarizer chip or a polarizer film.

17. The method as set forth in claim 13 further comprising bonding the polarizer element an end of the housing near the collimating lens.

18. The method as set forth in claim 13 further comprising providing a fiducial mark located on the housing at a center of a clear aperture of the collimating lens.

19. The method as set forth in claim 13, wherein the polarizer element comprises one of a waveplate, a retarder, or a polarization manipulation element positioned proximate the collimating lens.

20. The method as set forth in claim 13 further comprising hermetically sealing the housing.

\* \* \* \* \*